(Model.) 3 Sheets—Sheet 1.
O. VOLKERTS.
COMBINATION LOCK.
No. 378,027. Patented Feb. 14, 1888.
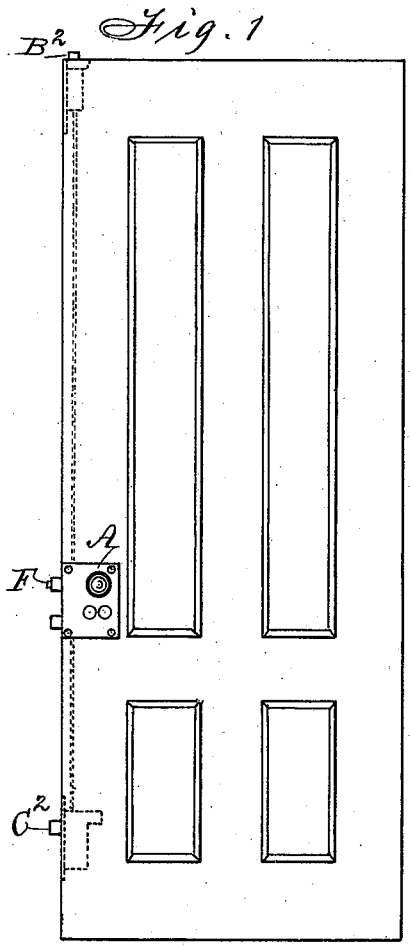
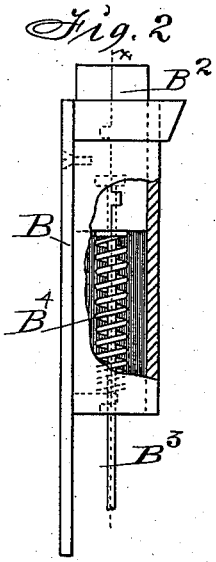
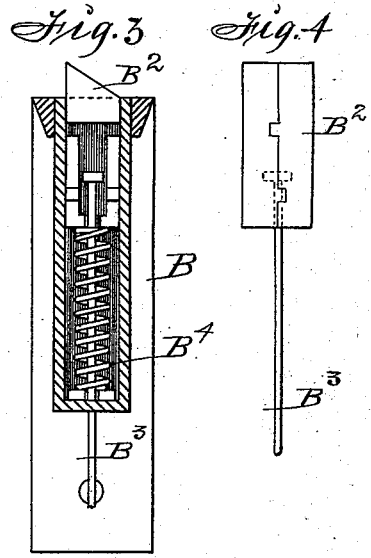
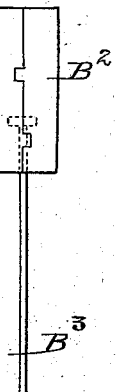
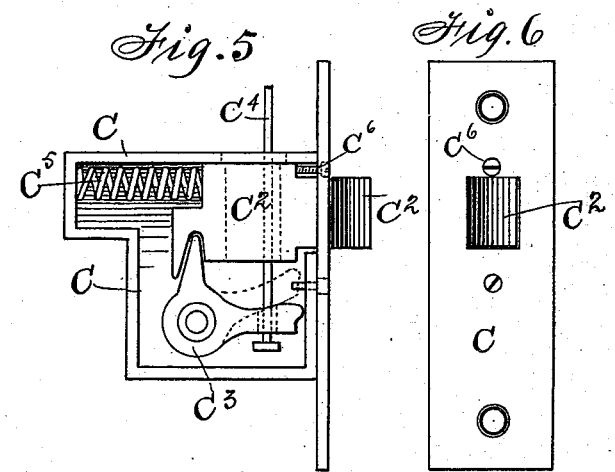
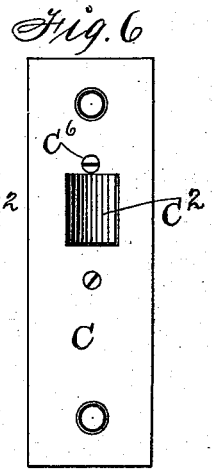
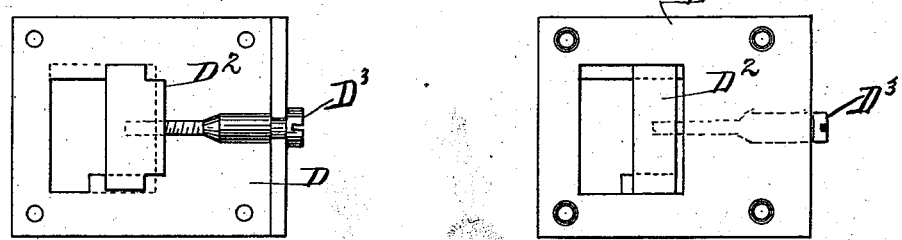
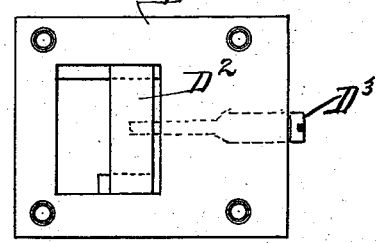
Witnesses:
O. M. Stiles
R. H. Orwig
Inventor:
Oluf Volkerts,
By Thomas G. Orwig, Atty.

(Model.) 3 Sheets—Sheet 2.
O. VOLKERTS.
COMBINATION LOCK.
No. 378,027. Patented Feb. 14, 1888.
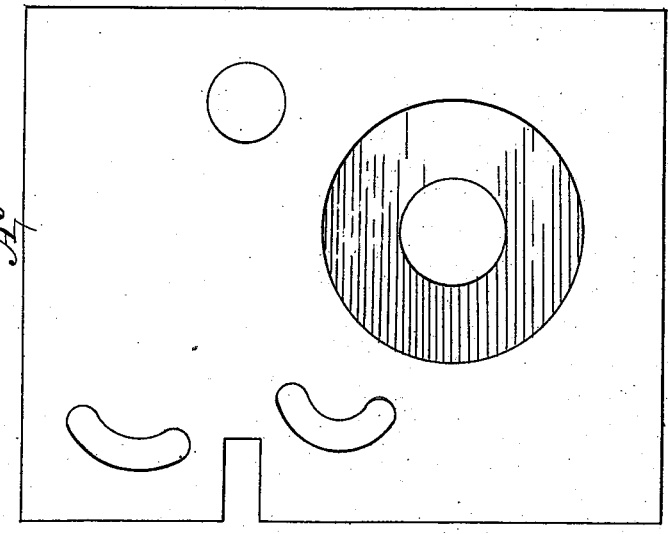
Fig. 10
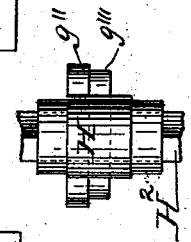
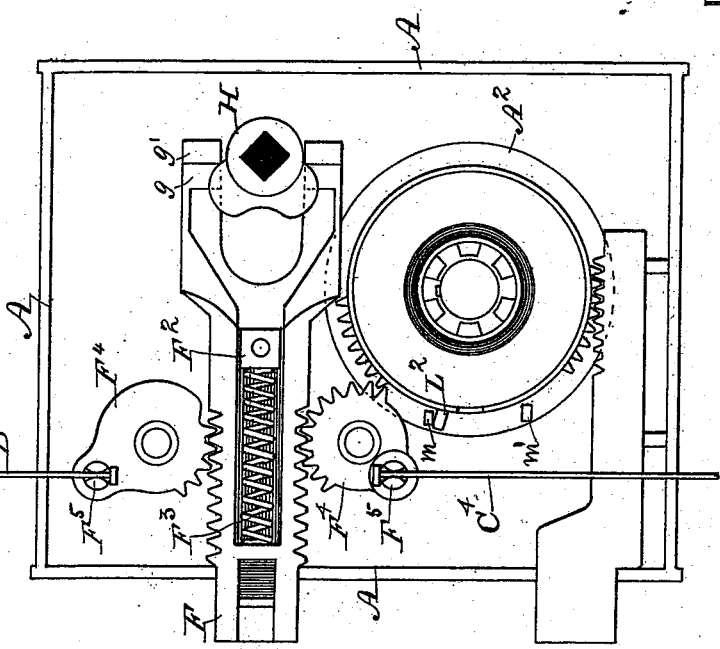
Fig. 9 Fig. 11
Witnesses: Inventor:
Oluf Volkerts,
By Thomas G. Orwig, Atty.

(Model.)
3 Sheets—Sheet 3.
O. VOLKERTS.
COMBINATION LOCK.
No. 378,027. Patented Feb. 14, 1888.
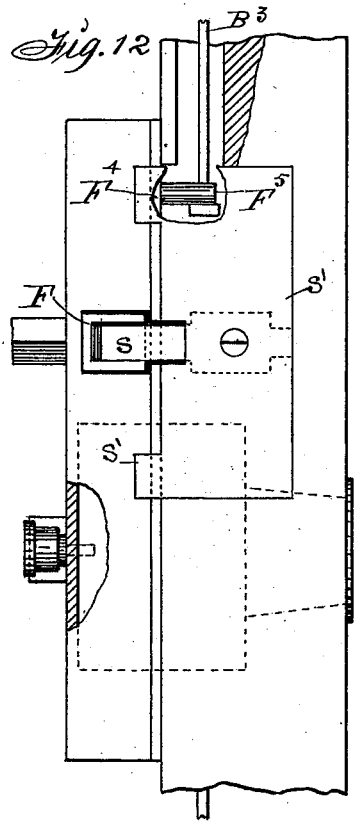
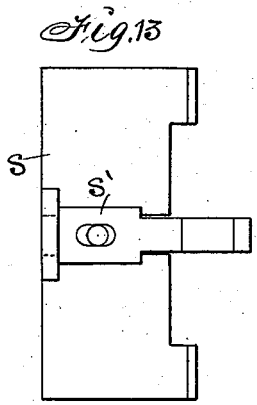
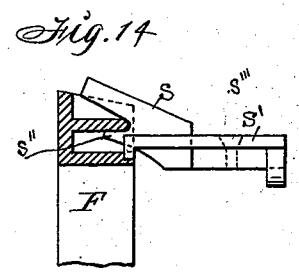
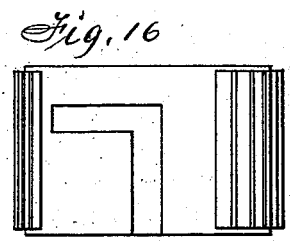
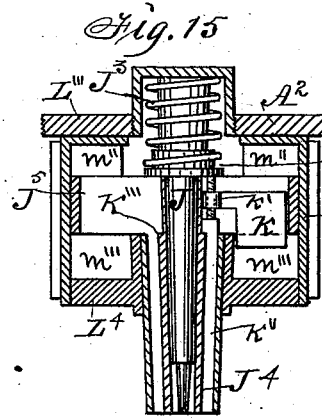
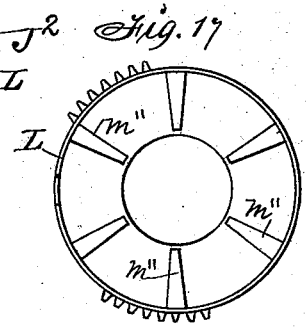
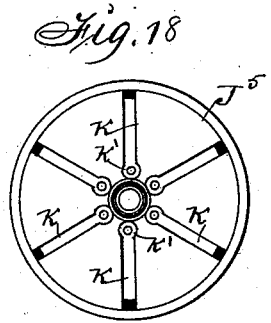
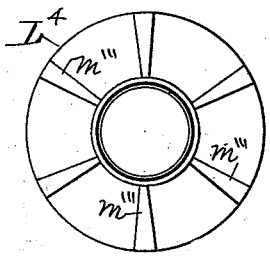
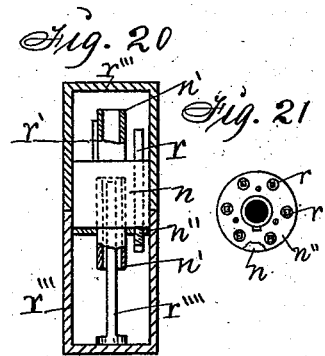
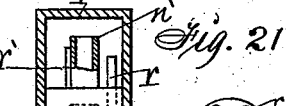
Witnesses:
J. S. McCartney
J. C. Tate.
Inventor:
Oluf Volkerts,
By Thomas G. Orwig, Atty.

UNITED STATES PATENT OFFICE.

OLUF VOLKERTS, OF SAC CITY, IOWA.

COMBINATION-LOCK.

SPECIFICATION forming part of Letters Patent No. 378,027, dated February 14, 1888.

Application filed May 14, 1887. Serial No. 238,262. (Model.)

*To all whom it may concern:*

Be it known that I, OLUF VOLKERTS, a citizen of the United States of America, and a resident of Sac City, in the county of Sac and State of Iowa, have invented a Combination-Lock for Doors, of which the following is a specification.

My invention consists in the construction, combination, application, and operation of a permutable lock, a permutable key, and auxiliary bolts with a hinged door, as hereinafter set forth, pointed out in my claims, and illustrated in the accompanying drawings, in which—

Figure 1 is a view of the inside face of a door to which my lock is applied in such a manner that bolts will simultaneously slide horizontally and vertically as the spindle is turned. Fig. 2 is a side view of the case and sliding bolt applied at the top of the door to move the bolt vertically. Fig. 3 is a sectional view through the line $x\ x$ of Fig. 2. Fig. 4 is a side view of the bolt formed in two parts to facilitate connecting a rod flexibly therewith. Fig. 5 is a view of the uncovered case and bolt that moves horizontally. Fig. 6 is a face view of the edge of the case shown in Fig. 5. Fig. 7 shows the outside, and Fig. 8 the inside, of one of my catches or strikers that can be adjusted to compensate for the swelling and shrinking of wood, as required, to engage the end of a bolt on a swinging door. Fig. 9 shows my lock-case and mechanism therein uncovered, and Fig. 10 shows the detached cover. Fig. 11 shows the under side of the sleeve or hub on the spindle that has projections to engage corresponding shoulders on the branches of the forked end of the sliding bolt. Fig. 12 is an edge view of a section of a door having my lock applied. Fig. 13 shows the inside face of a plate having a lever connected therewith to engage the front end of the sliding bolt in the lock. Fig. 14 is an end view of Fig. 13 and a section of the sliding bolt. Fig. 15 is a longitudinal sectional view of the rotating barrel and the permutable locking mechanism inclosed therein. Fig. 16 is a side view of the rotating barrel, showing a projection from an inside concentric part of the operating mechanism. Fig. 17 is a top view of the fixed bottom of the rotating barrel. Fig. 18 is a bottom view of the rotating part that has the fixed projection shown in Fig. 16. Fig. 19 is a bottom view of the part fixed in the top or end of the rotating barrel as shown in Fig. 15. Fig. 20 is a longitudinal sectional view of my mutable key and the case within which it is inclosed and carried. Fig. 21 is an end view of the key.

A, shown in Figs. 1 and 9, is the case that incloses the bolt-and-lock mechanism, and is adapted to be fastened against the face of a door and over a recess formed in the wood to admit the rotating barrel, or fitted in a mortise made through the edge of the door.

$A^2$ is a detachable section of the case A, to which the rotating barrel is combined in such a manner that the mechanism within the barrel can be changed without taking the case from the door.

$A^3$ is the detachable cover of the case A.

B is the case adapted to support the vertically-moving bolt at the top of the door, and also adapted to be fixed to the edge and corner of the door by means of screws.

$B^2$ is the sliding bolt inclosed in the case B. This bolt is formed in two mating parts that have cavities in their inside faces that will admit the head on the end of a rod, $B^3$, to form a flexible connection, as required, to allow the bolt to slide in and out of the case.

$B^4$ is a spring placed in the case B in such a manner that it will in its normal condition press the bolt upward and outward. A downward motion of the rod occurs when the door-knob and spindle are turned as required to unlatch and open a door. To make this bolt $B^2$ inoperative, I simply pass a screw through the face of the case to engage the bolt, as shown in Fig. 2.

C, shown in Figs. 1, 5, and 6, is the case of a horizontally-sliding bolt, $C^2$.

$C^3$ is an elbow-shaped lever pivoted in the case in such a manner that its short arm will extend into a notch in the side of the bolt.

$C^4$ is a rod that passes upward through a slot in the long arm of the same lever and also through a slot in the bolt $C^2$, to be connected with the latch in the case A in such a manner that when the door-knob and spindle are turned the latch $C^2$ will be drawn inward in concert with the vertically-moving latch $B^2$, as required, to open the door. A head on the end of the rod $C^4$ prevents it from slipping upward through the slotted arm of the lever C³. A spring, C⁵, presses the bolt outward. To make this bolt C² inoperative, I pass a screw through a screw-seat in the case C to engage the end of the lever C³, as indicated by dotted lines in Fig. 5. To restrict the outward motion of the bolt, I insert a screw, C⁶, in a screw-seat in the case C, and drive it inward to engage the bolt, as shown in Fig. 5. The projection of the bolt outside of the case is thus readily regulated, as required, to meet the catch or striker fixed to the jamb and to prevent noise and undue friction.

D, shown in Figs. 7 and 8, is the plate that carries an adjustable catch or striker, D², which striker is fitted in an opening in the plate in such a manner that its outside face will be even with the outside face of the plate.

D³ is a screw that has a journal at its head and fitted in a slot in the case in such a manner that the screw-threaded end will enter and engage the movable striker D² and impart motion thereto when the screw is rotated and prevented from longitudinal movement by means of the shoulder on the opposite sides of the slot in the case wherein the screw is journaled. The position of the striker that engages a bolt can be thus readily changed, as required, to compensate for the swelling or shrinking of wood without shifting the plate D on the jamb of a door or the lock carried on a swinging door, as heretofore.

F, clearly shown in Fig. 9, is a sliding bolt or latch in the case A. It has a longitudinal slot through which a post, F², extends from the case to serve as a guide for the sliding latch and also to restrict the outward motion of the latch. A spring, F³, placed in the slot of the latch engages the fixed post F² in such a manner that the spring will, in its normal condition, press the latch outward. Racks on the side edges of the sliding latch engage toothed levers F⁴, that are pivoted at the opposite sides of the latch in such a manner that the rectilinear motion of the latch will vibrate the levers, as required, to operate the latches B² and C² at the same instant. Arms F⁵ project from the toothed levers F, and are slotted at their ends so that the rods B³ and C⁴, having enlarged ends, can be readily flexibly connected with the levers by slipping the rods into the slots in the said arms, so that when the latch F is moved inward the rods will be drawn toward the latch F, as required, to draw the latches B² and C² inward at the same time.

The rear or inner end of the latch F is forked, and the end of each branch of the fork has two shoulders, g and g'. Corresponding shoulders g'' and g''' on the hub H, through which the spindle H² passes, fit and engage the shoulders g and g' in such a manner that in turning the spindle by means of a knob on its end, as required, to unlatch and open a door the shoulders on the hub will successively engage the shoulders on the forks to impart motion to the sliding latch F. The lateral projection on the hub can therefore be shorter than when there is but a single point of contact with each fork of the latch; and the leverage force of the spindle is increased by means of two such points of contact; and thus an improved result is obtained by the two points of contact on each side of the spindle and the forks of the bolt, in place of the single and longer projections heretofore used on each side of the hub of a spindle.

J is a post formed on or fixed to the inside of the detachable section A² of the case A.

J² is a flanged collar on the lower portion of the post J.

J³ is a coiled spring placed around the post J in such a manner that it will engage the base of the post and also the flange of the collar and press the collar toward the free end of the post.

J⁴ is the tubular stem of my mutable locking device, and J⁵ a circular enlargement at its end that engages the collar J². Radial slots formed in the stem and its enlarged end admit sliding keys, and jackets fixed on the outside cover the slots and keys.

The sliding keys k are uniform in shape and size and have inward extensions and screw-seats k', with which solid and square stems k'' are adjustably connected, as clearly shown in Fig. 15, in such a manner that each key can be mutated upon its own stem and all the keys mutated relative to each other in the radial slots of the extension J⁵. A shoulder, k''', on each square stem k'' prevents the stem from longitudinal movement toward the top of the post J, as required, to keep all their ends even with the end of the tubular stem J⁴, where they are visible, while the keys k are not even and their positions relative to each other invisible, so that a device for operating them must be adjusted to correspond with them.

L is the rotating barrel that incloses the locking device J⁴ J⁵, which slides and also rotates upon the post J and carries the mutable keys k. It has cogs on its periphery that engage the toothed lever F⁴, and a rack on the side of an auxiliary bolt, as shown in Fig. 9. It also has a slot, through which a cam, L², projects from the extension J⁵ within to engage guards m and m', that rise from the inside face of the case A.

L³ is the fixed under bottom of the barrel L, and m'' are guards that rise therefrom to prevent the rotating motion of the tubular device J⁴ J⁵, whenever one or more of the keys k are pressed down to engage said guards m''.

L⁴ is the fixed top in the barrel, from which guards m''' project inward to engage one or more of the keys k when said keys project from their slots toward the guards.

In the position the barrel L is shown in Fig. 9 the cam L² engages the guard m and prevents the part J⁴ J⁵ from rotating toward said cam, while one or more keys k engage guard m''' on the top L⁴, to prevent rotating in the opposite direction. The barrel L and latch F are, while the parts are in the position described, free to move and in an unlocked position, and to lock them it is necessary to depress the keys $k$, that engage the guards $m'''$ at the opposite end, so that the part $J^4 J^5$ can be rotated and the cam $L^2$ brought in contact with the guard $m'$. When this is effected and the pressure on the keys that depressed them is relaxed, the keys instantly rise again, pressed by the spring $J^3$, and engage the guards $m'''$, but on the opposite sides thereof, and lock the barrel to the part $J^4 J^5$, which part is locked by the cam $L^2$ in contact with the fixed guard $m'$, so that the barrel L and projected bolt F will be held stationary, as required, to retain a door locked. It is obvious that the locking mechanism thus locked cannot be unlocked without a device that can be applied to all of the stems $k''$ at the same instant to depress the one or more keys $k$, that engage the guards $m'''$, as required, to free the keys without depressing any one or more keys to engage the guards $m''$ at the opposite ends of the keys.

$n$ (shown in Figs. 20 and 21) is the cylindrical body of the key required for depressing the sliding keys $k$ to unlock the barrel L and the bolts that lock the door to the jamb. It has extensions $n'$ of smaller diameter at its ends, and a central longitudinal bore and a series of bores near its circumference corresponding in position with the ends of the series of the stems $k''$ of the sliding keys $k$.

$n''$ is a disk that has screw-threaded perforations coinciding with the said series of bores fixed on the end of the body $n$. A series of screw-threaded stems, $r$, having square ends, are passed through the perforations in the disk $n''$ to extend through the series of bores in such a manner that each one can be moved longitudinally by means of a common key applied to the square end, and the complete series adjusted so that their lower ends will be in the same relative positions to each other that the keys $k$ are to each other. It is obvious that the mutations of the stems $r$ can therefore be as numerous and varied as the mutations of the keys $k$, and that whenever a change of one or more of the keys $k$ is made it is necessary to make a corresponding change of stems $r$, so they will co-operate when connected in locking and unlocking a door.

$r'$ is a tongue fixed on the surface of the lower extension, $n'$, to engage a corresponding groove (not shown) in the top of the bore of the rotating stem $J^4$.

$r'''$ are the mating-sections of a case adapted to slip over the ends of the body $n$ and its extensions $n'$, to conceal and protect the mutating-stems $r$.

$r''''$ is a key fixed to the inside of one of these sections $r'''$, and adapted to be placed on the square ends of the stems $r$ to rotate and adjust them.

To unlock my complete locking mechanism when a door is locked thereby, as heretofore described, I simply place the body $n$ of the key over the end of the rotating stem $J^4$ to allow the tongue $r'$ to enter the groove $r''$, and the end of each stem $r$ to coincide with the end of each corresponding stem $k''$, and then press inward until the keys $k$, that engage the guards $m'''$, are released, so that the device $J^4 J^5$ can be turned to move the cam $L^2$ from the guard $m'$ to the guard $m$, as required, to release the barrel L, so it can be rotated by means of the knob and spindle to operate and withdraw the bolts from the fastenings on the door-jamb.

$s$, (shown in Figs. 13 and 14,) is a lever connected with the edge of the door by means of a plate, $s'$, and with the latch F by means of a projection, $s''$, that enters a notch in the said latch in such a manner that when the door is closed the lever $s$ will come in contact with the striker fixed to the door-jamb to be pressed inward as the door is closed; and as the lever is pressed in it moves the latch and relieves the latch from the blows incident to latches coming in direct contact with fixed strikers. An elongated slot in the lever $s$, coinciding with a perforation in the plate $s'$, through which a screw, $s'''$, is passed to fasten the plate to the wood and to pivot the lever to the plate, allows the lever to be vibrated.

From the foregoing description of the construction and function of each part the practical operation of the complete invention will be readily understood by persons familiar with locking mechanism.

I claim as my invention—

1. The bolt $B^2$, formed in sections having cavities inside, the rod $B^3$, having a head inclosed in the said cavities, and the spring $B^4$, in combination with the case B, for the purposes stated.

2. The detachable case-section $A^2$, having a fixed post, J, the spring $J^3$, placed on said post, and the flanged collar $J^2$, placed over the said spring and on said post, constructed and combined with a case, A, substantially as shown and described, for the purposes stated.

3. The tubular stem $J^4$, having an enlargement, $J^5$, and radial slots in said enlargement, a series of sliding keys, $k$, having screw-seats $k'$, and adjustable stems $k''$, having screw-threaded ends extended through said screw-seats, constructed and combined to operate in the manner set forth, for the purposes stated.

4. The barrel L, having a fixed bottom, $L^3$, and guards $m''$ on the inside face of said bottom, a fixed top, $L^4$, having guards $m'''$ on its inside face, in combination with the tubular stem $J^4 J^5$, carrying the keys $k$, and the fixed post J, for the purposes stated.

5. The rotating tubular stem $J^4 J^5$, having a cam, $L^2$, in combination with the rotating barrel L, and the case A, having fixed guards $m$ and $m'$, for the purposes stated.

6. The rotating barrel L, having cogs on its periphery, the pivoted lever $F^4$, and the latch F, having a rack on its edge, constructed and combined in a case, to operate in the manner set forth.

7. The post J, the collar $J^2$, the spring $J^3$, the rotating device $J^4 J^5$, the keys $k\ k'$, the adjustable stems $k''$, the barrel L, having fixed bottom $L^3$ and fixed top $L^4$, and guards $m''$ and $m'''$, constructed and combined to operate in the manner set forth.

8. The key comprising the body $n$, having extension $n'$, the adjustable stem $r$, having a tongue, $r'$, on one of the said extensions, the mating-sections $r'''$, and the key-stem $r''''$, constructed and combined to operate in the manner set forth, for the purposes stated.

OLUF VOLKERTS.

Witnesses:
R. H. ORWIG,
THOMAS G. ORWIG.